Sept. 15, 1953
M. F. PETERS
2,652,223
SEALING OF FLUID SYSTEMS
Filed Jan. 2, 1951
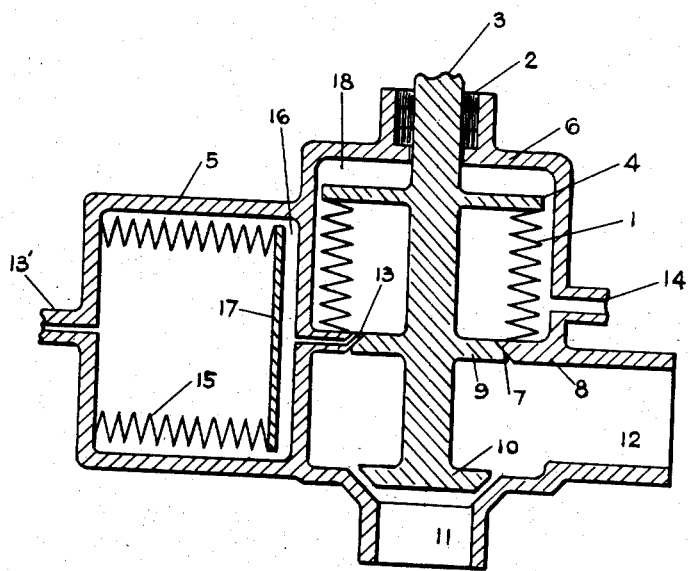
INVENTOR.
MELVILLE F. PETERS
BY
Martin J. Finnegan
ATTORNEY Patented Sept. 15, 1953

2,652,223

UNITED STATES PATENT OFFICE 2,652,223

SEALING OF FLUID SYSTEMS

Melville F. Peters, East Orange, N. J.

Application January 2, 1951, Serial No. 203,902

6 Claims. (Cl. 251—31)

This invention relates to fluid systems, and particularly to the sealing of such systems against accidental escape of harmful fluids at a dangerous pressure or velocity.

In many fluid systems the control of fluid flow is by use of valves having bellows assemblies associated therewith; the use of bellows being desirable because they lend themselves to hermetic sealing of the system and thus increase the safety factor. Even in bellows installations, however, a failure can occur; and an object of the present invention is to provide means for establishing a secondary fluid seal adapted to minimize the likelihood of such a failure.

Another object of the invention is to provide a hermetically sealed reservoir into which may be diverted any fluid that is trapped in a primary sealing chamber, to prevent the development of a dangerous condition; such diverted fluid being thereafter returned to the system.

A further object is to provide auxiliary fluid pressure relief means for diverting from the region of the valve stem any harmful fluids that might otherwise be expelled at dangerously high pressure or velocity, by way of such valve stem, in the event of failure of the primary bellows seal.

In the drawing the primary bellows seal is shown at 1, the main valve head at 10, controlling the main fluid flow path 11—12, the main valve housing at 6, and the reservoir at 5; the latter containing a second bellows assembly 15 having an end plate 17 that may move to the left in response to the withdrawal of pressure fluid by way of the control passage through the center of housing extension 13'. This control passage may lead to a remotely disposed manually operable pulsator type of piston-cylinder combination for transmitting fluid pressure to the interior of bellows unit 15. Alternatively, the shifting of plate 17 may be by means of a manually operable rod attached thereto and extending out through element 13'. A passage 13 establishes communication between the interior of bellows 1 and the annular space between bellows 15 and the housing 5.

The relationship of auxiliary housing 5 to the main housing 6 may be as illustrated, or the housing 5 may be a separate unit and the passage 13 in the form of a connecting conduit from one unit to the other. Again, the point of entry of passage 13, with respect to chamber 5, may be as illustrated, or it may be at some other level, depending on whether complete gravity drainage of chamber 5 is desired.

In the illustrated position of the main valve—this being the position for flow between conduits 11 and 12—the secondary valve collar 9 engages seat 7 in wall 8 of the main housing, thus sealing bellows 1 from the conduit 12. Pressure exerted by the fluid trapped in bellows 1 is relieved by being diverted to auxiliary reservoir 5, by way of passage 13. Subsequently, on closure of valve 10, and concurrent opening of secondary valve 7, the plate 17 of auxiliary bellows 15 operates to exert pressure on the fluid in reservoir 5 and return such fluid to the system, by way of the same passage 13.

In case of failure of primary bellows 1, large vent 14 provides an immediate pressure relief, so that there is no possibility of emergence of fluid through packing gland 2 and the valve stem at a dangerously high pressure or velocity.

What I claim is:

1. In a fluid system, a main flow control valve stem having upper and lower valve heads, a primary sealing means located above said upper valve head, and effective throughout the period of flow through said lower valve head, said upper valve head closing off flow into said primary sealing means when said lower valve head is in flow-permitting position, and a secondary sealing means communicating with the interior of said primary sealing means to relieve excessive pressure within said primary sealing means.

2. In a fluid system, a main flow control valve, a primary sealing bellows effective throughout the period of flow through said valve, and a secondary sealing means communicating with the interior of said bellows to serve as a reservoir for fluid trapped in said bellows.

3. A system as defined in claim 2, wherein said secondary sealing means includes a reservoir, and secondary bellows means associated with said reservoir to control operation thereof.

4. A system as defined in claim 2, including a housing surrounding said primary bellows, said housing also surrounding the stem of said flow control valve, and means integral with said housing for diverting fluid pressure from around said valve stem in the event of failure of said bellows.

5. In a fluid system, a valve housing having three compartments, one of said compartments having inlet and outlet ports, the second having a bellows assembly serving to divide said second compartment into inner and outer chambers, the third compartment being in constant communication with said inner chamber, and a valve assembly including one part controlling flow through said inlet port to said outlet port, and a second part disposed to prevent flow between said first compartment and the inner chamber of said second compartment when the inlet port is open, said third compartment serving as a reservoir for fluid accumulated in said inner chamber.

6. A fluid system as defined in claim 5, including means in said third compartment for causing fluid to flow back to the inner chamber of said second compartment when said valve assembly is moved to inlet port closing position.

MELVILLE F. PETERS.

References Cited in the file of this patent

UNITED STATES PATENTS

| Number | Name | Date |
|---|---|---|
| 2,281,417 | Darby | Apr. 28, 1942 |
| 2,495,081 | Thomas | Jan. 17, 1950 |